United States Patent
Tsuchiya

(10) Patent No.: US 9,188,931 B2
(45) Date of Patent: Nov. 17, 2015

(54) VIBRATION TYPE DRIVING APPARATUS AND IMAGE FORMING APPARATUS

(71) Applicant: CANON KABUSHIKI KAISHA, Tokyo (JP)

(72) Inventor: Satoshi Tsuchiya, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/321,560

(22) Filed: Jul. 1, 2014

(65) Prior Publication Data

US 2015/0010333 A1  Jan. 8, 2015

(30) Foreign Application Priority Data

Jul. 4, 2013   (JP) .................................. 2013-140520
Jun. 6, 2014   (JP) .................................. 2014-118116

(51) Int. Cl.
*G03G 15/00* (2006.01)
*H02N 2/16* (2006.01)

(52) U.S. Cl.
CPC .............. *G03G 15/757* (2013.01); *H02N 2/163* (2013.01)

(58) Field of Classification Search
CPC .......... G03G 15/757; H02N 2/00; H02N 2/12
USPC ....................................... 399/167; 310/323.02
See application file for complete search history.

(56) References Cited

U.S. PATENT DOCUMENTS

| 5,300,850 | A | | 4/1994 | Okumura |
| 5,610,468 | A | | 3/1997 | Miyazawa |
| 5,686,776 | A | * | 11/1997 | Takagi et al. ............ 310/323.04 |
| 6,141,515 | A | * | 10/2000 | Takeda et al. ................. 399/167 |
| 7,245,058 | B2 | | 7/2007 | Fujimoto |
| 7,937,024 | B2 | * | 5/2011 | Muto et al. ..................... 399/167 |
| 8,035,275 | B2 | | 10/2011 | Ashizawa |
| 8,095,044 | B2 | * | 1/2012 | Maeda et al. ................. 399/167 |

FOREIGN PATENT DOCUMENTS

| JP | 8-214569 A | 8/1996 |
| JP | 2625555 B2 | 7/1997 |
| JP | 3805242 B2 | 8/2006 |
| JP | 4941469 B2 | 5/2012 |

* cited by examiner

*Primary Examiner* — William J Royer
(74) *Attorney, Agent, or Firm* — Canon USA Inc. IP Division

(57) ABSTRACT

For example, the present invention relates to a vibration type driving apparatus which includes: a vibrating body that includes an elastic body provided with a vibrating portion, and an electrical-mechanical energy converting element fixed to the elastic body; and a driven body in pressure contact with a frictional portion of the vibrating portion, wherein the vibrating body and the driven body are relatively moved by driving vibration generated when an alternating voltage is applied to the electrical-mechanical energy converting element; the elastic body includes a fixing portion for fixing the vibrating body to another member, and a connecting portion for connecting the vibrating portion and the fixing portion; and the connecting portion includes plural uneven rigidity components in a circumferential direction.

29 Claims, 14 Drawing Sheets

FIG. 4

| VIBRATION MODE | RESONANCE FREQUENCY [kHz] | Δf [Hz] |
|---|---|---|
| ORDER 6 OUT-OF-PLANE | 32.8 | 16 |
| ORDER 3 TORSIONAL | 34.5 | 474 |
| ORDER 7 OUT-OF-PLANE | 42.4 | 5 |
| ORDER 3 IN-PLANE | 43.7 | 477 |
| ORDER 5 TORSIONAL | 56.5 | 2 |
| ORDER 6 TORSIONAL | 68.3 | 306 |
| ORDER 3 CIRCUMFERENTIALLY EXTENDING/CONTRACTING | 84.5 | 400 |
| ORDER 6 IN-PLANE | 85.2 | 404 |

FIG. 6

| VIBRATION MODE | RESONANCE FREQUENCY [kHz] | Δf [Hz] |
|---|---|---|
| ORDER 7 OUT-OF-PLANE | 42.4 | 18 |
| ORDER 7 TORSIONAL | 79.1 | 271 |
| ORDER 7 IN-PLANE | 98.0 | 739 |

FIG. 8

| VIBRATION MODE | RESONANCE FREQUENCY [kHz] | Δf [Hz] |
|---|---|---|
| ORDER 3 TORSIONAL | 32.7 | 791 |
| ORDER 6 OUT-OF-PLANE | 32.8 | 15 |
| ORDER 3 IN-PLANE | 41.3 | 462 |
| ORDER 7 OUT-OF-PLANE | 42.4 | 15 |
| ORDER 7 TORSIONAL | 79.2 | 584 |
| ORDER 3 CIRCUMFERENTIALLY EXTENDING/CONTRACTING | 84.2 | 230 |

VIBRATION TYPE DRIVING APPARATUS AND IMAGE FORMING APPARATUS

BACKGROUND OF THE INVENTION

Field of the Invention

One aspect of the disclosure relates to a vibration type driving apparatus that brings a movable body into contact with a vibrating body and frictionally drives the same, and for example, relates to a technique to address an issue of undesired vibration of the vibrating body that adversely affects driving performance of the vibration type driving apparatus. One aspect of the disclosure relates to an image forming apparatus comprising the vibration type driving apparatus.

A vibration type driving apparatus (for example, an ultrasonic motor) which comprises a vibrating body in which driving vibration is formed, and a driven body which is in pressure contact with the vibrating body, wherein the vibrating body and the driven body are relatively moved by driving vibration has been proposed.

Hereinafter, a configuration of an annular vibration type driving apparatus as an exemplary vibration type driving apparatus will be described with reference to FIGS. 10, 11A and 11B.

FIG. 10 is a cross-sectional view of a vibration type driving apparatus of a related art. FIG. 11A is a cross-sectional view and FIG. 11B is a front view of an elastic body of the vibration type driving apparatus illustrated in FIG. 10.

The related art annular vibration type driving apparatus includes a vibrating body 100 and a movable body 200. The vibrating body 100 includes an elastic body 110 to which a piezoelectric element 120 as an electrical-mechanical energy converting element is joined. The movable body 200 is in frictional contact with the vibrating body 100.

The vibration type driving apparatus also includes a pressure mechanism 300 and a shaft 400 which bring the movable body 200 into pressure contact with the vibrating body 100 and output rotation of the movable body 200. The vibrating body 100, the movable body 200 and the pressure mechanism 300 are arranged in a circle.

The pressure mechanism 300 is constituted by a vibration control rubber 301, a pressure spring receiving member 302, a pressure spring 303 and a pressure spring fixing member 304.

Plural grooves 131 extending in a radial direction (a radial direction of the vibrating body) are formed in a circumferential direction in a vibrating portion 111 of the elastic body 110. Plural projections 130 for increasing vibration displacement are formed between the plural grooves 131.

A connecting portion 112 for supporting the vibrating portion 111 is formed integrally with an inner diameter portion of the vibrating portion 111. Further, a mounting portion (a fixing portion) 113 for fixing the vibrating body 100 to another member is formed integrally with the inner diameter portion.

The elastic body 110 is fixed to a housing 500, which includes bearings 502, by screws 501 via mounting holes 140.

When an AC signal is applied to the piezoelectric element 120, previously set m-th order bending vibration (it is also referred to order m bending vibration (m is an integer equal to or greater than 1)) is excited in the vibrating body 100 as driving vibration. The movable body 200 is frictionally driven by a movement (including a circular movement and an elliptic movement) produced at a contact portion between the movable body 200 and the vibrating body 100 caused by the thus excited vibration.

The m-th order bending vibration refers to the bending vibration of which number of waves is m.

Here, vibration other than the previously set mt-h order bending vibration (the driving vibration), which will be referred to as undesired vibration, may be caused due to, for example, the following factors: low precision of a friction surface on which the vibrating body 100 and the movable body 200 are in contact with each other; unevenness in mechanical vibration caused in the vibrating body 100; and unevenness in contact pressure distribution in the vibrating body 100 and the movable body 200.

The undesired vibration may cause unusual noise, output reduction and other problems. In order to address these issues, Japanese Patent No. 3805242 and Japanese Patent No. 4941469 each propose a vibrating body of a vibration type driving apparatus which reduces excitation of undesired vibration.

In these related art techniques, depending on a thickness of the connecting portion 112 of the vibrating body 100, a resonance frequency of undesired vibration of the vibrating body 100 is excluded from a driving frequency range of the AC signal applied to the piezoelectric element 120 and from its harmonic region, so as to reduce excitation of undesired vibration.

Further, Japanese Patent No. 2625555 proposes a vibration type driving apparatus which reduces excitation of bending vibration other than m-th order bending vibration (driving vibration) as undesired vibration by making bending rigidity of the vibrating portion 111 of the vibrating body 100 uneven.

SUMMARY OF THE INVENTION

However, the techniques described in Japanese Patent No. 3805242 and in Japanese Patent No. 4941469 have had the following problem: if the resonance frequency of the undesired vibration in the vibrating body 100 is to be completely excluded from the driving frequency range and from its harmonic region, a machine design of the vibrating body 100 is severely limited.

Further, even if the bending rigidity of the vibrating portion 111 of the vibrating body 100 is made uneven as described in the technique of Japanese Patent No. 2625555, it is not enough in reducing some kinds of undesired vibration, such as torsional vibration. There is also a problem that, if excitation of the same order m torsional vibration as that of the driving vibration is to be reduced, the m-th order bending vibration which is the driving vibration is adversely affected.

An aspect of the present invention relates to a vibration type driving apparatus that is easy in machine design of a vibrating body and is capable of reducing occurrence of undesired vibration and capable of driving stably.

An aspect of the present invention is a vibration type driving apparatus, including: a vibrating body that includes an elastic body provided with a vibrating portion, and an electrical-mechanical energy converting element fixed to the elastic body; and a driven body in pressure contact with a frictional portion of the vibrating portion, wherein the vibrating body and the driven body are relatively moved by driving vibration generated when an alternating voltage is applied to the electrical-mechanical energy converting element;

the elastic body includes a fixing portion for fixing the vibrating body to another member, and a connecting portion for connecting the vibrating portion and the fixing portion; and the connecting portion includes uneven rigidity components of plural orders in a circumferential direction.

Another aspect of the present invention is a vibration type driving apparatus, including: a vibrating body that includes an elastic body provided with a vibrating portion, and an electrical-mechanical energy converting element fixed to the elastic body; and a driven body in pressure contact with a frictional portion of the vibrating portion, wherein the vibrating body and the driven body are relatively moved by driving vibration generated when an alternating voltage is applied to the electrical-mechanical energy converting element;

the elastic body includes a fixing portion for fixing the vibrating body to another member, and a connecting portion for connecting the vibrating portion and the fixing portion; and the connecting portion includes uneven rigidity components in a circumferential direction; and a number indicating quantity of the uneven rigidity components is i times (i is 0.5, 1 or 2) greater than the order of undesired vibration existing in a driving frequency range of the alternating voltage.

A yet another aspect of the present invention is a vibration type driving apparatus, including: a vibrating body that includes an elastic body provided with a vibrating portion, and an electrical-mechanical energy converting element fixed to the elastic body; and a driven body in pressure contact with a frictional portion of the vibrating portion, wherein the vibrating body and the driven body are relatively moved by driving vibration generated when an alternating voltage is applied to the electrical-mechanical energy converting element;

the elastic body includes a fixing portion for fixing the vibrating body to another member, and a connecting portion for connecting the vibrating portion and the fixing portion;

the connecting portion includes uneven rigidity components in a circumferential direction; and an order a number indicating quantity of the uneven rigidity components is j times (j is 0.5, 1 or 2) greater than the order of undesired vibration in a harmonic region of n times (n is an integer equal to or greater than 2) greater than the driving frequency range of the alternating voltage.

A further aspect of the present invention relates to a vibration type driving apparatus, including: a vibrating body that includes an elastic body provided with a vibrating portion, and an electrical-mechanical energy converting element fixed to the elastic body; and a driven body in pressure contact with a frictional portion of the vibrating portion, wherein the vibrating body and the movable body are relatively moved by driving vibration generated when an alternating voltage is applied to the electrical-mechanical energy converting element;

the elastic body includes a fixing portion for fixing the vibrating body to another member, and a connecting portion for connecting the vibrating portion and the fixing portion; and the connecting portion includes uneven rigidity components in a circumferential direction, and a number indicating quantity of the uneven rigidity components is p times (p is 0.5, 1 or 2) greater than an order m (m is an integer equal to or greater than 1) of the driving vibration.

In this specification, the driving frequency range of the alternating voltage refers to a range from the minimum value to the maximum value of the frequency of the alternating voltage that is applied to the electrical-mechanical energy converting element when the vibration type driving apparatus is driven, or a range set so that the alternating voltage may be applied in consideration of the characteristics of the vibration type driving apparatus.

Further features of the present invention will become apparent from the following description of exemplary embodiments with reference to the attached drawings.

BRIEF DESCRIPTION OF THE DRAWINGS

FIG. 4 is a diagram illustrating examples of frequencies of vibration modes of a vibration type driving apparatus.

FIG. 6 is a diagram illustrating examples of frequencies of vibration modes of a vibration type driving apparatus.

FIG. 8 is a diagram illustrating examples of frequencies of vibration modes of a vibration type driving apparatus.

DESCRIPTION OF THE EMBODIMENTS

Hereinafter, embodiments for implementing the present invention will be described.

First Embodiment

As a first embodiment, an exemplary configuration of a vibration type driving apparatus to which the present invention has been applied will be described.

The vibration type driving apparatus of the present embodiment includes a vibrating body and a movable body. The vibrating body includes an elastic body which is provided with a vibrating portion and to which an electrical-mechanical energy converting element is joined. The movable body is in pressure contact with a frictional portion provided in the vibrating portion.

When an alternating voltage of a frequency in a predetermined driving frequency range is applied to the electrical-mechanical energy converting element, previously set m-th order bending vibration (m is an integer equal to or greater than 1) is excited in the vibrating portion as driving vibration.

In this manner, the vibrating body and the movable body are relatively moved by the driving vibration.

In the present embodiment, the bending vibration of the vibrating portion (out-of-plane vibration) used as the driving vibration is supposed to be order m=6 vibration (out-of-plane order 6 vibration) and order m=7 vibration (out-of-plane order 7 vibration) as specific examples and a vibrating body that reduces excitation of undesired vibration of order 3, order 6 or order 12 will be described. Here, the undesired vibration refers to a vibration mode of which vibration form differs from that of out-of-plane vibration which is driving vibration.

First, an elastic body of the present embodiment will be described with reference to FIGS. 1A and 1B.

Figure 1A:
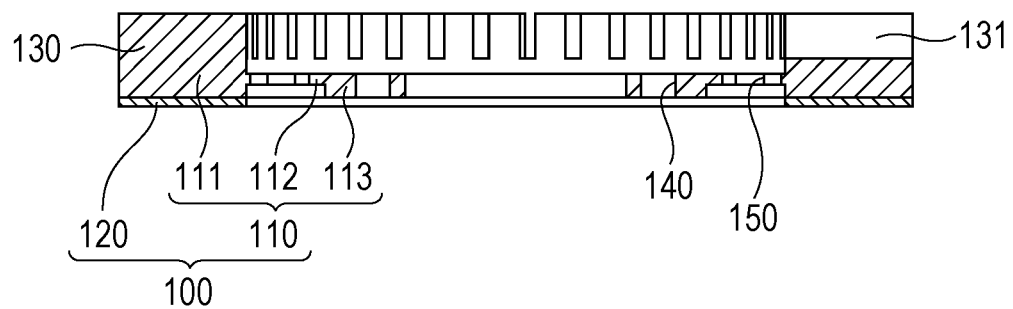
FIG. 1A is a diagram illustrating an exemplary configuration of a vibration type driving apparatus, and is a cross-sectional view of an elastic body.
Figure 1B:
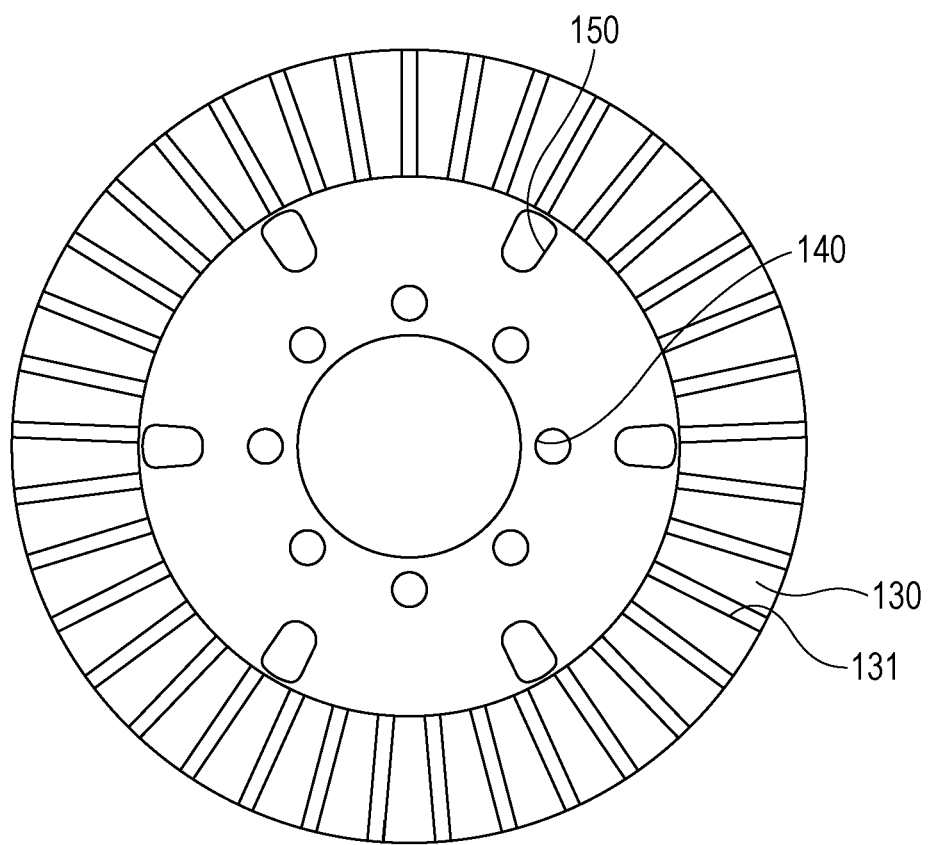
FIG. 1B is a diagram illustrating an exemplary configuration of a vibration type driving apparatus, and is a front view of an elastic body.

FIG. 1A is a cross-sectional view of the elastic body and FIG. 1B is a front view of the elastic body.

In FIGS. 1A and 1B, the reference numeral 100 denotes a vibrating body and 110 denotes an elastic body to which a piezoelectric element 120 is joined.

Plural grooves 131 extending in a radial direction (a radial direction of the vibrating body 100) are formed in a circumferential direction in a vibrating portion 111 of the elastic body 110. Plural projections 130 for increasing vibration displacement are formed between the plural grooves 131.

A connecting portion 112 for supporting the vibrating portion 111 is formed integrally with an inner diameter portion of the vibrating portion 111. Further, a mounting portion (a fixing portion) 113 for fixing the vibrating body 100 to another member is formed integrally with the inner diameter portion.

The elastic body 110 of the present embodiment includes holes for uneven rigidity 150 that are through holes formed in the connecting portion 112 that extends from a neutral plane of bending vibration (out-of-plane vibration) used as driving vibration. An example in which, with the existence of the holes for uneven rigidity 150, an order (a number indicating quantity) of an uneven rigidity component of the elastic body 110 is i times (i is 0.5, 1 or 2) greater than the order of the undesired vibration existing in the driving frequency range of the alternating voltage will be described.

For example, in order to reduce order 3 undesired vibration, six holes for uneven rigidity 150, twice the order 3 (i=2 or j=2), are formed in the connecting portion 112 in a circumferential direction at regular intervals. Therefore, the number of the uneven rigidity components in the circumferential direction of the connecting portion 112 is 6.

In this case, 6, which is the number of the uneven rigidity components of the holes for uneven rigidity 150, is also 1 time as many as the order 6 (i=1 or j=1). Therefore, the configuration of the elastic body 110 described above is also a configuration that reduces order 6 undesired vibration.

Further, 6, which is the number of the uneven rigidity components of the holes for uneven rigidity 150, is also 0.5 times greater than the order 12 (i=0.5 or j=0.5). Therefore, the configuration of the elastic body 110 described above is also a configuration that reduces order 12 undesired vibration.

Figure 2A:
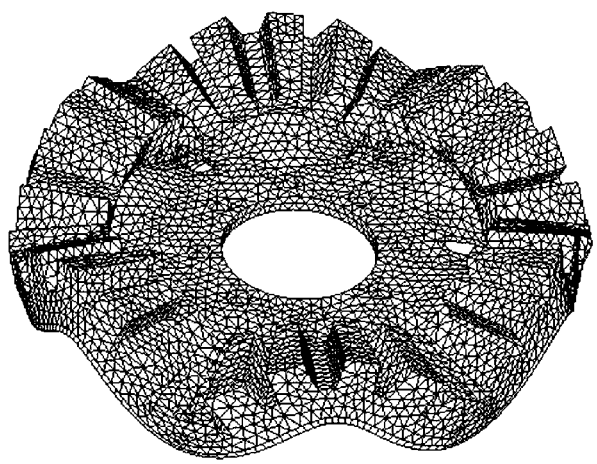
FIGS. 2A and 2B are diagrams illustrating an example of driving vibration of a vibration type driving apparatus.
Figure 2B:
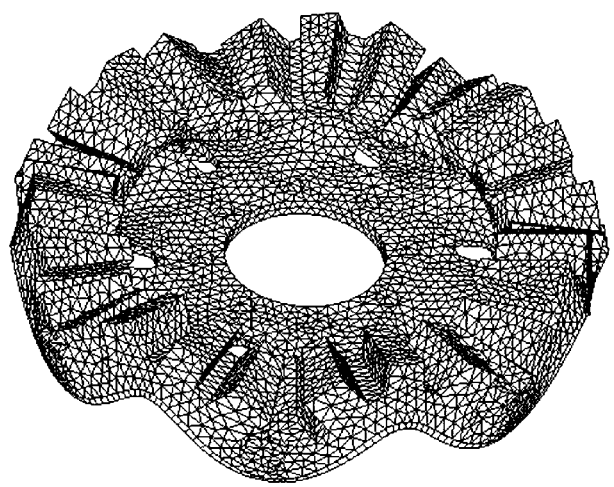

FIG. 2A illustrates an example of m=6 vibration (out-of-plane order 6 vibration) and FIG. 2B illustrates an example of m=7 vibration (out-of-plane order 7 vibration).

Figure 3A:
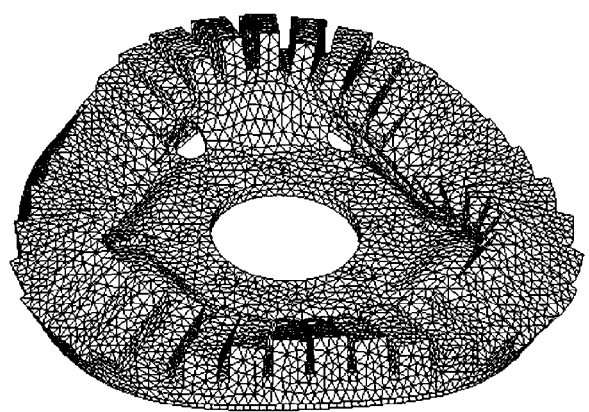
FIGS. 3A to 3C are diagrams illustrating an example of driving vibration of a vibration type driving apparatus.
Figure 3B:
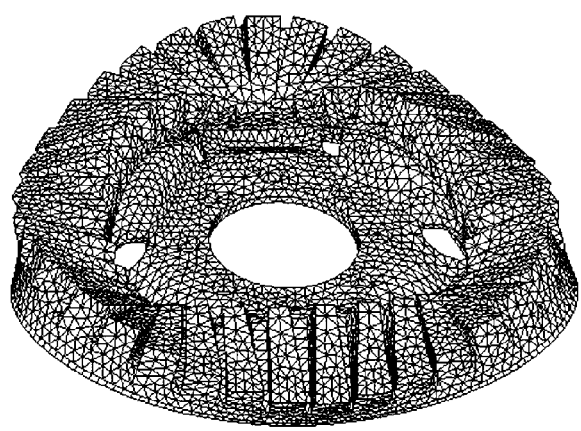
Figure 3C:
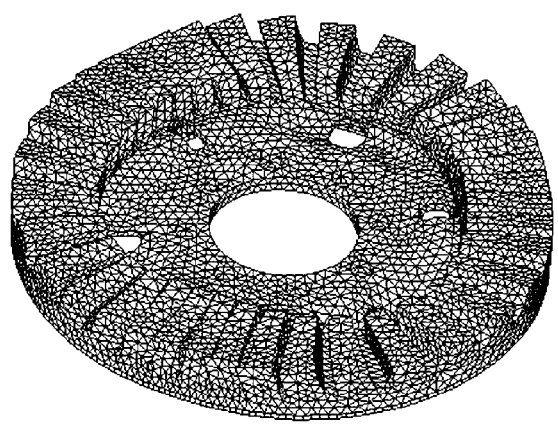

FIGS. 3A to 3C are diagrams illustrating deformation of an example of order 3 undesired vibration that may adversely affect the driving of the vibration type driving apparatus in the vibrating body 100 of the present embodiment. The vibration forms of the undesired vibration illustrated in FIGS. 3A to 3C differ from that of the out-of-plane vibration which is the driving vibration.

FIG. 3A illustrates torsional order 3 vibration, FIG. 3B illustrates in-plane order 3 vibration, and FIG. 3C illustrates circumferentially extending/contracting order 3 vibration. Unillustrated order 6 or order 12 undesired vibration is different from order 3 undesired vibration in the number of waves, but is the same in the vibration form. With the existence of the six holes for uneven rigidity 150, the vibrating body 100 of the present invention may reduce excitation of the order 3 vibration that is undesired vibration illustrated in FIGS. 3A to 3C and the unillustrated order 6 and order 12 undesired vibration groups without adversely affecting the out-of-plane order 6 vibration and out-of-plane order 7 vibration which are driving vibration illustrated in FIGS. 2A and 2B.

The reason thereof will be described below.

Since the connecting portion 112 is formed to extend from the neutral plane of out-of-plane vibration of the vibrating portion 111, the holes for uneven rigidity 150 formed in the connecting portion 112 do not affect the out-of-plane vibration.

Since the order 3, the order 6 or the order 12 undesired vibration groups respectively are vibration modes in which the connecting portion 112 is deformed, these undesired vibration groups are greatly affected by the holes for uneven rigidity 150 formed in the connecting portion 112.

Each of the order 3 undesired vibration groups is a vibration mode which has six antinodes and six nodes in a circumferential direction of the elastic body 110. Each of the order 6 undesired vibration groups is a vibration mode which has 12 antinodes and 12 nodes in a circumferential direction of the elastic body 110. Each of the order 12 undesired vibration groups is a vibration mode which has 24 antinodes and 24 nodes in a circumferential direction of the elastic body 110.

For that reason, by forming six holes for uneven rigidity 150, there arises a difference between a resonance frequency of the vibration mode in which the holes for uneven rigidity 150 are used as the antinodes and a resonance frequency of the vibration mode in which the holes for uneven rigidity 150 are used as the nodes. Therefore, the order 3, the order 6 and the order 12 undesired vibration groups do not become progressive vibration waves and occurrence thereof may be avoided.

FIG. 4 illustrates the resonance frequencies and frequency differences $\Delta f$ caused by uneven rigidity of the resonance frequencies regarding the exemplary vibration modes of the vibrating body 100 of the present embodiment.

The out-of-plane order 6 vibration and the out-of-plane order 7 vibration used as driving vibration have small $\Delta f$ and are not affected by the holes for uneven rigidity 150 provided in the connecting portion 112.

$\Delta f$ of the torsional order 3 vibration, $\Delta f$ of the in-plane order 3 vibration and $\Delta f$ of the circumferentially extending/contracting order 3 vibration that are the order 3 undesired vibration groups are greater than $\Delta f$ of the out-of-plane vibration. Therefore, occurrence of the order 3 undesired vibration is reduced by the holes for uneven rigidity 150.

If the undesired vibration groups coincide with the frequency of the driving signal and its harmonic region of the vibration type driving apparatus, it is highly possible that the undesired vibration groups adversely affect the driving of the vibration type driving apparatus.

Therefore, the influence described above may be reduced by configuring the elastic body so that the order of uneven rigidity components includes an order of j times (j is 0.5, 1 or 2) greater than the order of the undesired vibration in the harmonic region of n times (n is an integer equal to or greater than 2) greater than the driving frequency range of the alternating voltage. Here, the harmonic region of n times greater than the driving frequency range of the alternating voltage refers to a frequency range from n times greater than the lower limit of the driving frequency range to n times greater than the upper limit of the driving frequency of the alternating voltage.

For example, if the out-of-plane order 6 vibration illustrated in FIG. 4 is used as the driving vibration, a frequency of about 32.8 kHz that is the resonance frequency of the out-of-plane order 6 vibration is used as the driving frequency. At this time, a resonance frequency of torsional order 3 vibration exists at 34.5 kHz in the driving frequency range.

Further, if the out-of-plane order 7 vibration in which resonance frequency exists at 42.4 kHz is used as the driving vibration, the resonance frequency of the in-plane order 3 vibration is located at 43.7 kHz near the resonance frequency of the out-of-plane order 7 vibration. Further, the resonance frequency of the circumferentially extending/contracting order 3 vibration is located at 84.5 kHz in the harmonic area that is twice higher than the driving frequency.

In this manner, if the undesired vibration group is located in the driving frequency or in its harmonic region, the undesired vibration is most likely to adversely affect the driving of the vibration type driving apparatus. Therefore, it is effective to reduce excitation of the undesired vibration group by the holes for uneven rigidity 150 as in the present embodiment.

Although the location of the undesired vibration is at the driving frequency and at the harmonic region that is twice higher than the driving frequency in the present embodiment, an order of undesired vibration of n times (n is an integer equal to or greater than 2) greater than the harmonic region may also be included. Also if the undesired vibration is located in the harmonic region of 3 times or greater, the influence becomes smaller as a multiple becomes large, but the effect is still the same.

Although an example in which the vibrating body 100 includes the grooves 131 and the projections 130 formed in the vibrating portion 111 has been described in the present embodiment, an annular vibrating body that does not include the grooves 131 and the projection 130 when the annular vibration type driving apparatus is configured still has the same effect with respect to the undesired vibration.

Although uneven rigidity is formed in the connecting portion 112 by the holes for uneven rigidity 150 that are the through holes arranged at equal intervals in the present embodiment, it is not necessary that the holes uneven rigidity 150 are through holes arranged at equal intervals. Alternatively, for example, grooves may be formed at equal intervals in the connecting portion 112 or a thickness of the connecting portion 112 may be distributed in the shape of a sine wave.

Figure 9:
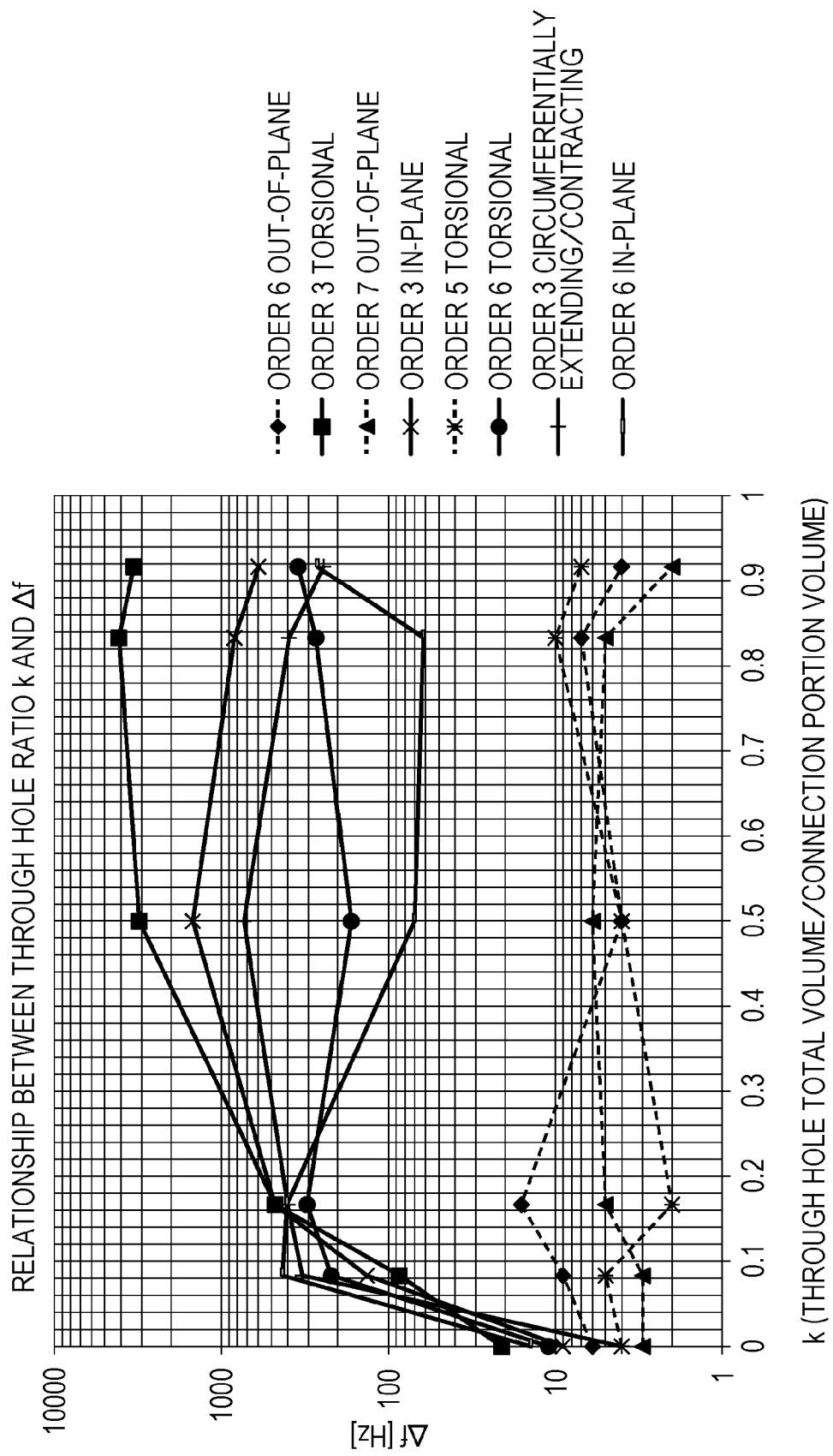
FIG. 9 is a graph illustrating changes in frequencies of vibration modes of a vibration type driving apparatus.
Figure 10:
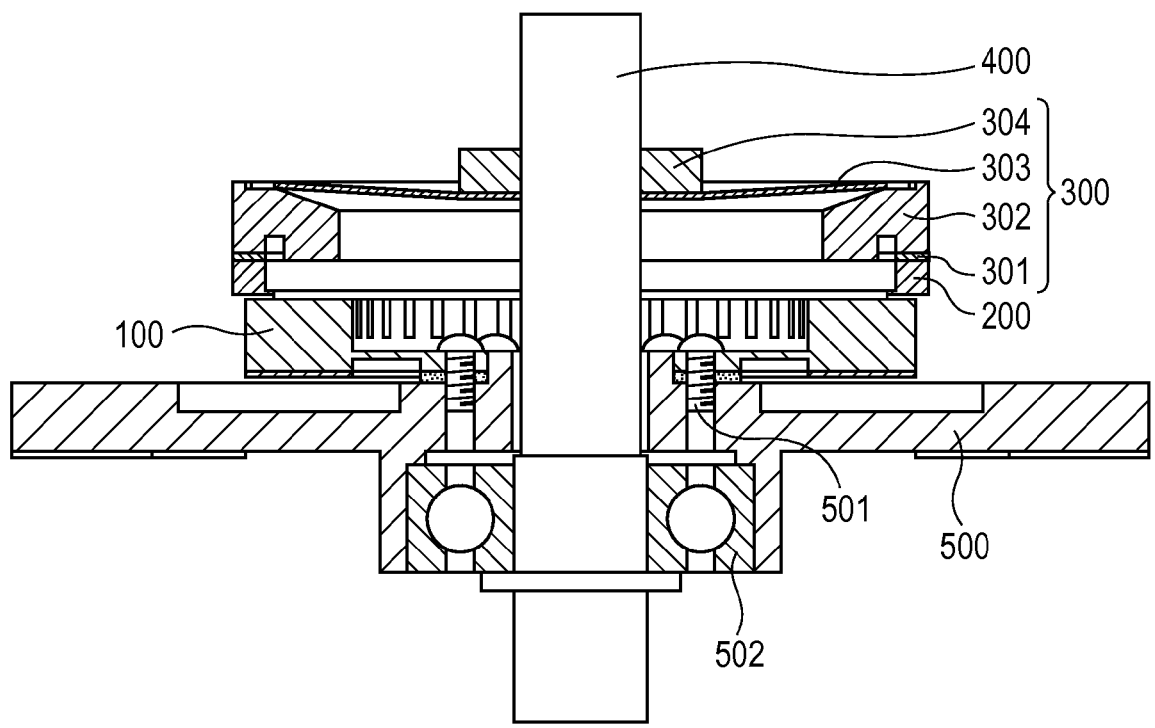
FIG. 10 is a cross-sectional view illustrating an exemplary configuration of a vibration type driving apparatus.
Figure 11A:
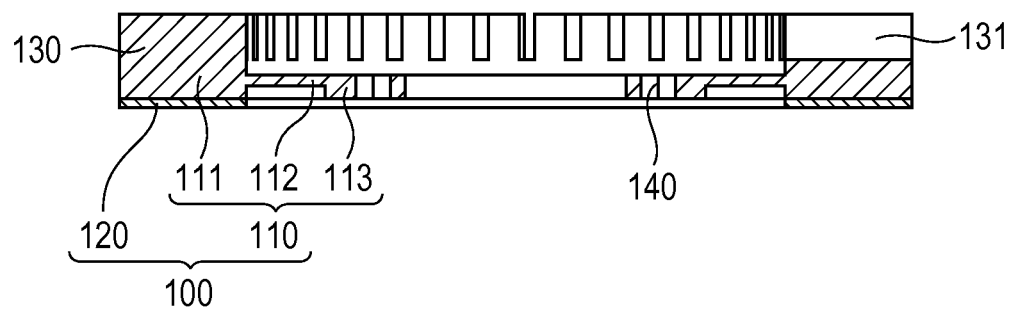
FIG. 11A is a diagram illustrating an exemplary configuration of a vibration type driving apparatus, and is a cross-sectional view of an elastic body.
Figure 11B:
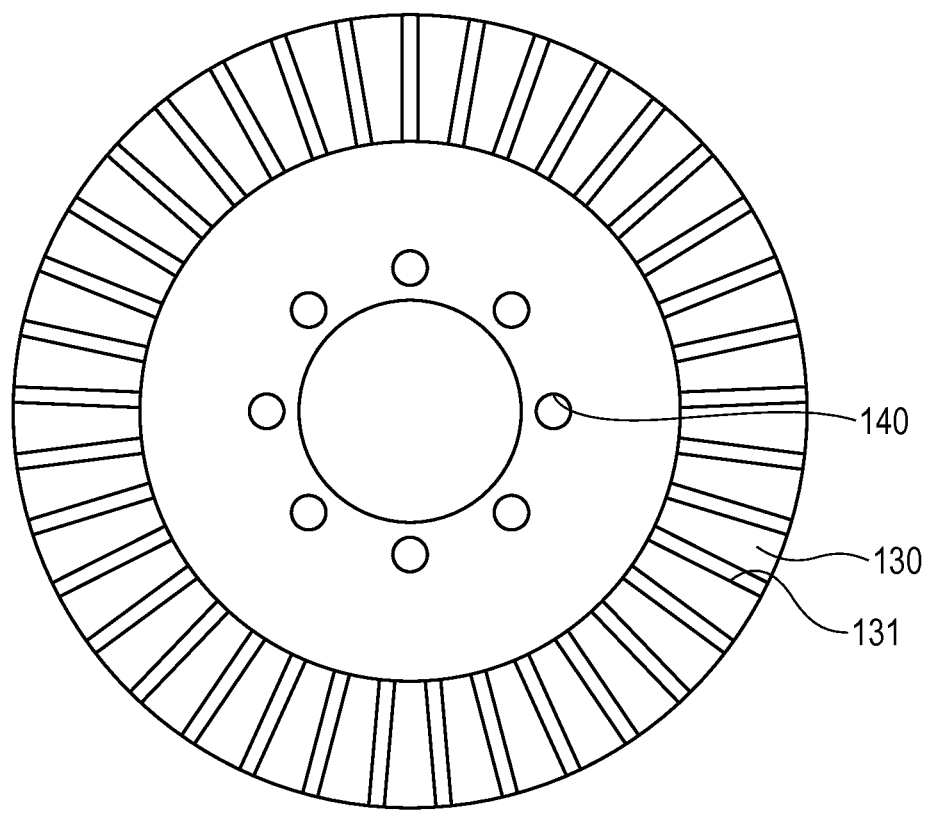
FIG. 11B is a diagram illustrating an exemplary configuration of a vibration type driving apparatus, and is a front view of an elastic body.

FIG. 9 is a graph about the size of the through holes of the present embodiment.

A horizontal axis corresponds to a ratio k of the total volume of the through holes to the volume of the connecting portion 112 (a volume ratio k of the through holes to the connecting portion 112) and a vertical axis corresponds to Δf.

A dashed line represents a vibration mode in which excitation is not intentionally reduced in the present embodiment and a solid line represents a vibration mode in which excitation is intentionally reduced in the present embodiment.

In the vibrating body 100 of the present embodiment illustrated in FIG. 1, k is set to k=0.17. According to FIG. 9, Δf of the vibration mode in which excitation is reduced starts separating from Δf of the vibration mode in which excitation is not reduced at k≥0.02.

Regarding the volume ratio k of the through hole with respect to the connecting portion 112, k≤0.7 is desirable in consideration of the intensity of the connecting portion. Therefore, it is desirable to set 0.02≤k≤0.7 in consideration of the effect of reducing the undesired vibration and the intensity of the connecting portion.

With the vibrating body 100 of the present embodiment, it is possible to reduce occurrence of the undesired vibration and to drive the vibration type driving apparatus stably.

Second Embodiment

As a second embodiment, a case in which an order of uneven rigidity components includes an order of p times (p is 0.5, 1 or 2) greater than a m-th order (m is an integer equal to or greater than 1) of driving vibration will be described.

For example, an exemplary configuration of the vibrating body 100 which reduces excitation of the order 7 undesired vibration will be described while order m=7 vibration (out-of-plane order 7 vibration) is supposed to be bending vibration (out-of-plane vibration) of the vibrating portion 111 used as driving vibration.

Here, the undesired vibration refers to a vibration mode of which vibration form differs from that of out-of-plane vibration which is driving vibration.

First, an elastic body 110 of the present embodiment will be described with reference to FIGS. 5A and 5B.

Figure 5A:
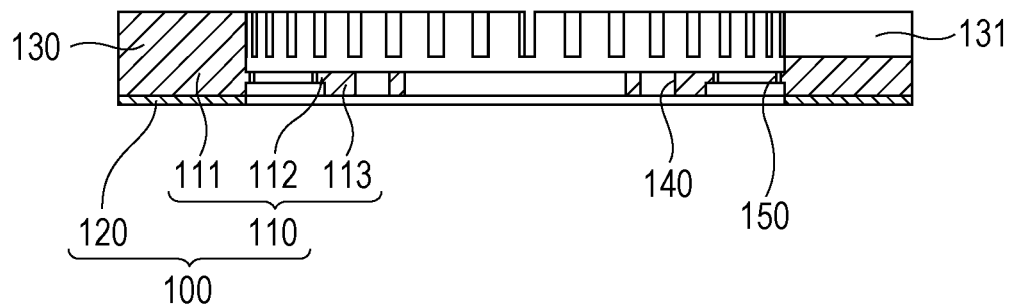
FIG. 5A is a diagram illustrating an exemplary configuration of a vibration type driving apparatus, and is a cross-sectional view of an elastic body.
Figure 5B:
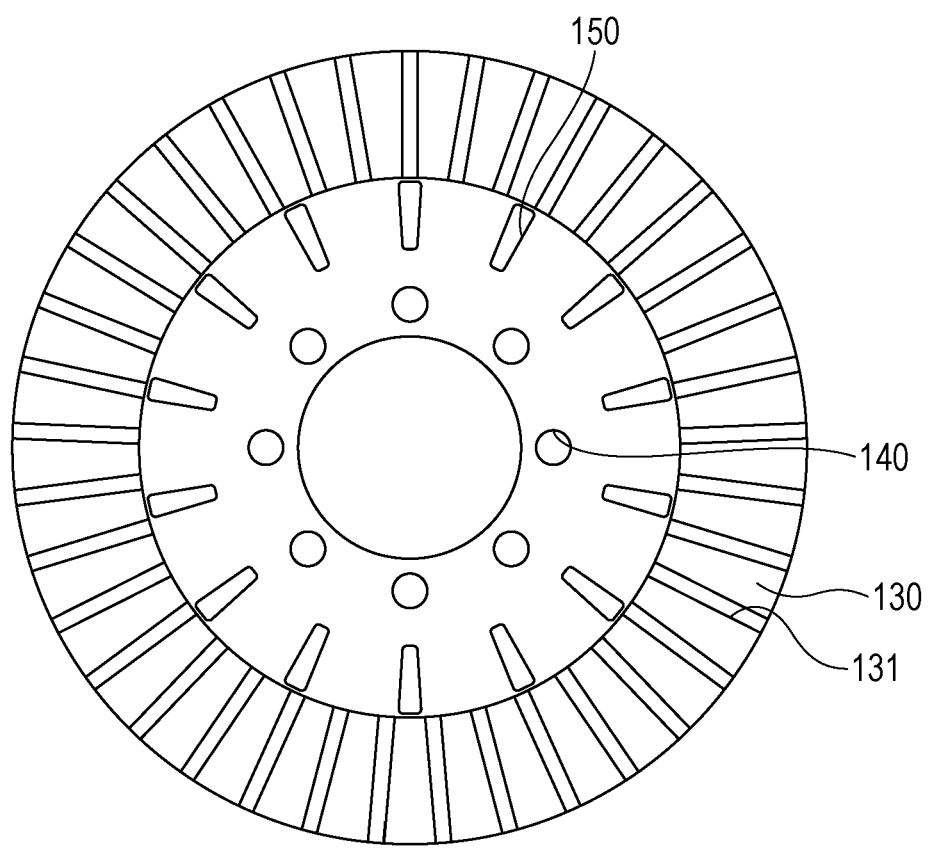
FIG. 5B is a diagram illustrating an exemplary configuration of a vibration type driving apparatus, and is a front view of an elastic body.

FIG. 5A is a cross-sectional view of the elastic body 110 and FIG. 5B is a front view of the elastic body.

The elastic body 110 of the present embodiment includes holes for uneven rigidity 150 that are through holes formed in the connecting portion 112 that extends from a neutral plane of bending vibration (out-of-plane vibration) used as driving vibration. In order to reduce order 7 undesired vibration, 14 holes for uneven rigidity 150, twice the order 7, are formed in the connecting portion 112 in a circumferential direction at regular intervals. Therefore, the number of the uneven rigidity components in the circumferential direction of the connecting portion 112 is 14 (p=2).

With the existence of the 14 holes for uneven rigidity 150, the vibrating body 100 of the present embodiment may reduce excitation of the order 7 undesired vibration group which has the same order as that of the driving vibration without adversely affecting the out-of-plane order 7 vibration which is the driving vibration.

FIG. 6 illustrates the resonance frequencies and frequency differences Δf caused by uneven rigidity of the resonance frequencies regarding the exemplary vibration modes of the vibrating body 100 of the present embodiment.

The out-of-plane order 7 vibration used as driving vibration has small Δf and is not affected by the holes for uneven rigidity 150 provided in the connecting portion 112.

Δf of the torsional order 7 vibration and Δf of the in-plane order 7 vibration that are the order 7 undesired vibration groups are greater than Δf of the out-of-plane vibration. Although not illustrated in FIG. 6, Δf of circumferentially extending/contracting order 7 vibration is also large. Therefore, occurrence of the order 7 undesired vibration is reduced by the holes for uneven rigidity 150.

In the vibrating body of the present embodiment, it is obvious from the first embodiment that excitation of order 14 undesired vibration is also reduced in addition to order 7 undesired vibration.

Although the location of the undesired vibration is at the driving frequency and at the harmonic region that is twice higher than the driving frequency in the present embodiment, also if the undesired vibration is located in the harmonic region of 3 times or greater, the influence becomes smaller as a multiple becomes large, but the effect is still the same.

Although an example in which the vibrating body 100 includes the grooves 131 and the projections 130 formed in the vibrating portion 111 has been described in the present embodiment, an annular vibrating body that does not include the grooves 131 and the projection 130 when the annular vibration type driving apparatus is configured still has the same effect with respect to the undesired vibration.

Although uneven rigidity is formed in the connecting portion 112 by the holes for uneven rigidity 150 that are the through holes arranged at equal intervals in the present embodiment, it is not necessary that the holes are through holes arranged at equal intervals. Alternatively, for example, grooves may be formed at equal intervals in the connecting portion 112 or a thickness of the connecting portion 112 may be distributed in the shape of a sine wave.

The total volume of the through holes arranged at equal intervals described in the present embodiment is desirably set to $0.02 \leq k \leq 0.7$ when k denotes a ratio with respect to a volume of the connecting portion 112. This is the result in consideration of the effect or reducing the undesired vibration and the intensity of the connecting portion 112 in the same manner as in the first embodiment.

With the vibrating body 100 of the present embodiment, it is possible to reduce occurrence of the undesired vibration and to drive the vibration type driving apparatus stably.

Third Embodiment

As a third embodiment, an exemplary configuration of the vibrating body 100 which reduces excitation of the order 3 and order 7 undesired vibration will be described while order m=6 vibration (out-of-plane order 6 vibration) and order m=7 vibration (out-of-plane order 7 vibration) are supposed to be bending vibration (out-of-plane vibration) of the vibrating portion 111 used as driving vibration.

Here, the undesired vibration refers to a vibration mode of which vibration form differs from that of out-of-plane vibration which is driving vibration.

First, an elastic body 110 of the present embodiment will be described with reference to FIGS. 7A and 7B.

Figure 7A:
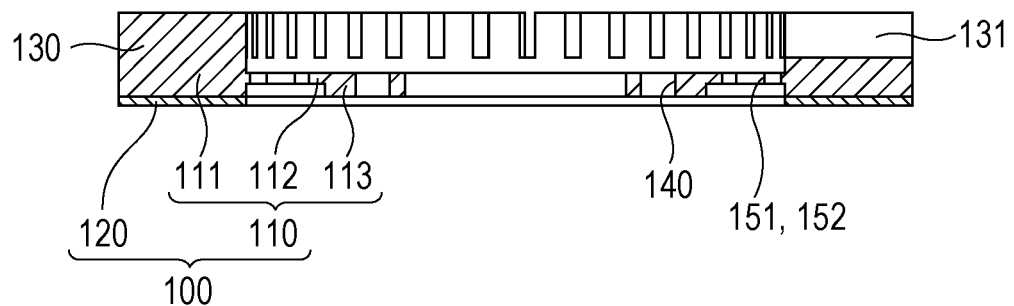
FIG. 7A is a diagram illustrating an exemplary configuration of a vibration type driving apparatus, and is a cross-sectional view of an elastic body.
Figure 7B:
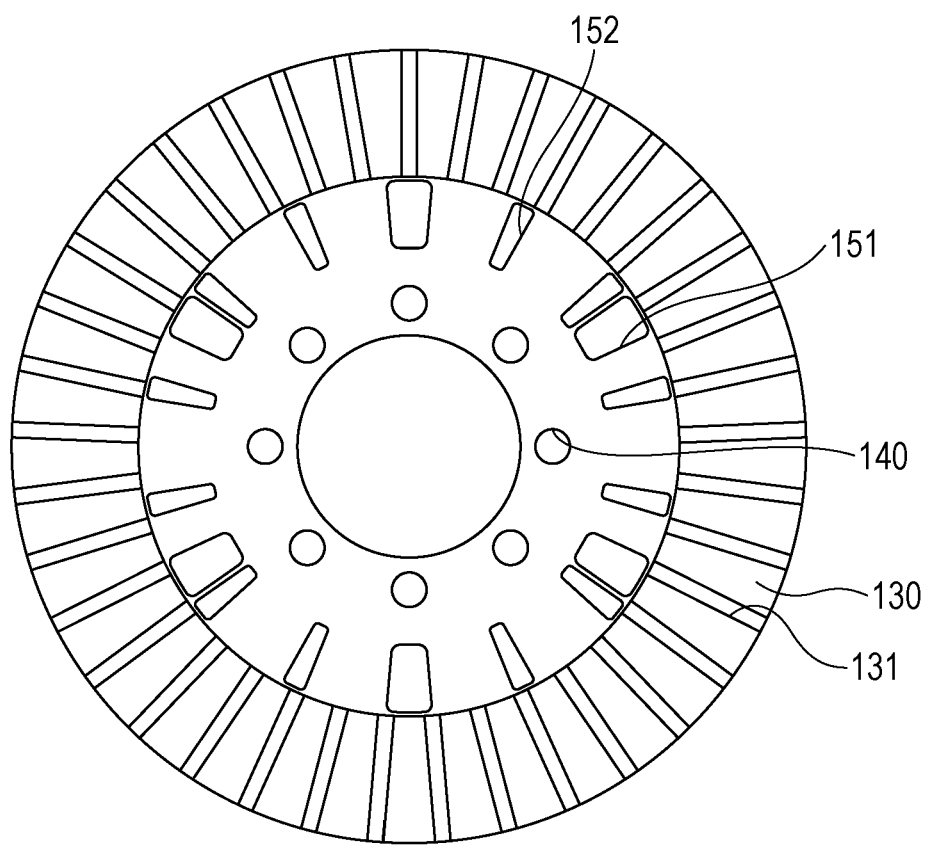
FIG. 7B is a diagram illustrating an exemplary configuration of a vibration type driving apparatus, and is a front view of an elastic body.

FIG. 7A is a cross-sectional view of the elastic body 110 and FIG. 7B is a front view of the elastic body 110.

In the elastic body 110 of the present embodiment, holes for uneven rigidity 151 for order 3 undesired vibration which are through holes, and holes for uneven rigidity 152 for order 7 undesired vibration which are through holes are formed in a connecting portion 112 which extends from a neutral plane of bending vibration (out-of-plane vibration) used as driving vibration.

The holes for uneven rigidity 151 for order 3 undesired vibration are formed to reduce the order 3 undesired vibration and six holes for uneven rigidity 151, twice the order 3, are formed in a circumferential direction at regular intervals.

The holes for uneven rigidity 152 for order 7 undesired vibration are formed to reduce the order 7 undesired vibration and 14 holes for uneven rigidity 152, twice the order 7, are formed at regular intervals.

Although 18 through holes are illustrated in FIG. 7B, this is because the holes for uneven rigidity 151 for order 3 undesired vibration and the holes for uneven rigidity 152 for order 7 undesired vibration overlap at two places.

The uneven rigidity components in the circumferential direction of the connecting portion 112 of the elastic body 110 of the present embodiment is 6 and 14.

With the existence of the two kinds of holes 151 and 152 for uneven rigidity, the vibrating body 100 of the present invention may reduce excitation of order 3 and order 7 undesired vibration group without adversely affecting the out-of-plane order 6 vibration and the out-of-plane order 7 vibration which are the driving vibration.

FIG. 8 illustrates the resonance frequencies and frequency differences Δf caused by uneven rigidity of the resonance frequencies regarding the exemplary vibration modes of the vibrating body 100 of the present embodiment.

The out-of-plane order 6 vibration and the out-of-plane order 7 vibration used as driving vibration have small Δf and are not affected by the two kinds of holes for uneven rigidity 151 and 152 provided in the connecting portion 112. Further, Δf of the order 3 undesired vibration group and Δf of the order 7 undesired vibration group are larger than Δf of out-of-plane vibration. Therefore, occurrence of the order 3 undesired vibration and the order 7 undesired vibration are reduced by the holes for uneven rigidity 151 and 152.

In the vibrating body 100 of the present embodiment, it is obvious from the first embodiment that excitation of order 6 undesired vibration and order 14 undesired vibration are also reduced in addition to order 3 undesired vibration and order 7 undesired vibration.

Although the location of the undesired vibration is at the driving frequency and at the harmonic region that is twice higher than the driving frequency in the present embodiment, also if the undesired vibration is located in the harmonic region of 3 times or greater, the influence becomes smaller as a multiple becomes large, but the effect is still the same.

Although an example in which the vibrating body 100 includes the grooves 131 and the projections 130 formed in the vibrating portion 111 has been described in the present embodiment, an annular vibrating body that does not include the grooves 131 and the projections 130 when the annular vibration type driving apparatus is configured still has the same effect with respect to the undesired vibration.

Although uneven rigidity is formed in the connecting portion 112 by the holes for uneven rigidity 151 and 152 that are the through holes arranged at equal intervals in the present embodiment, it is not necessary that the holes are through holes arranged at equal intervals. Alternatively, for example, grooves may be formed at equal intervals in the connecting portion 112 or a thickness of the connecting portion 112 may be distributed in the shape of a sine wave.

The total volume of the through holes arranged at equal intervals described in the present embodiment is desirably set to $0.02 \leq k \leq 0.7$ when k denotes a ratio with respect to a volume of a connecting portion 112. This is the result in consideration of the effect or reducing the undesired vibration and the intensity of the connecting portion 112 in the same manner as in the first embodiment.

Fourth Embodiment

In the present embodiment, an exemplary apparatus of the vibration type driving apparatus will be described with reference to FIGS. 12 to 15. As the apparatus described with reference to FIGS. 12 to 15 hereinafter, the vibration type driving apparatus described in, for example, the first or the second embodiment may be used.

Figure 12:
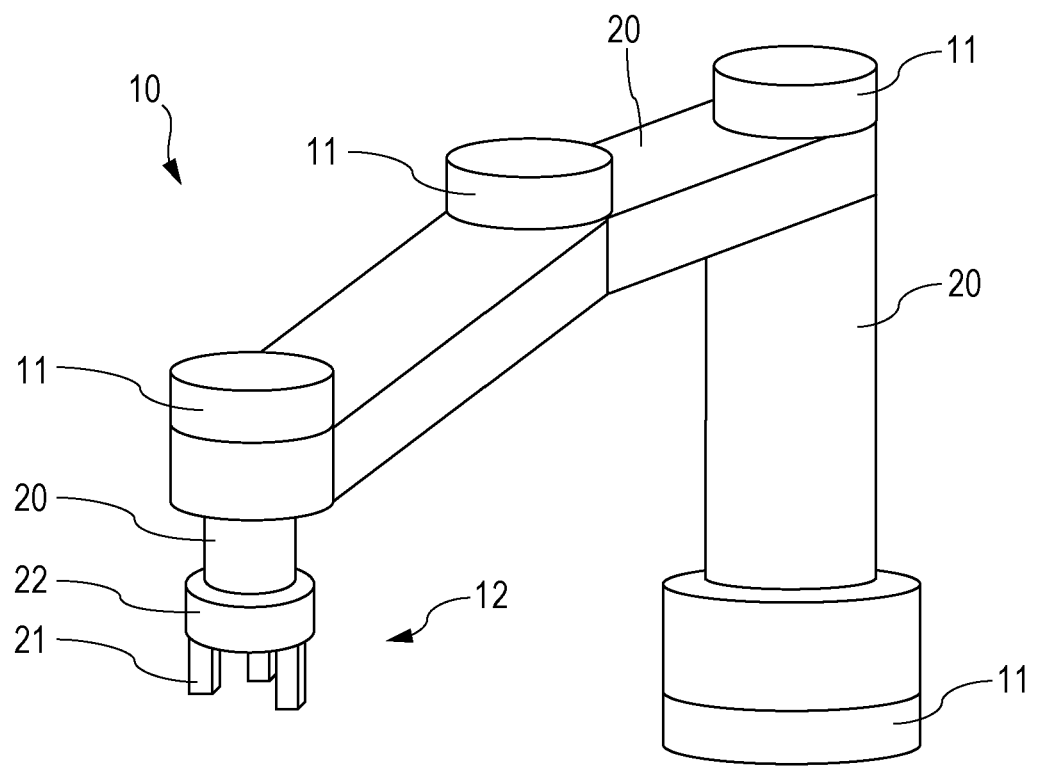
FIG. 12 is a perspective view of an example of an industrial robot which is an apparatus on which a vibration type driving apparatus is mounted.

FIG. 12 is a perspective view of a robot on which the vibration type driving apparatus is to be mounted. Illustrated is an exemplary horizontally articulated robot 10 which is a kind of industrial robots.

As illustrated in FIG. 12, the vibration type driving apparatus is incorporated in an arm joint portion 11 or in a hand portion 12. The arm joint portion 11 is provided between arms 20 and is connected to the arms 20. The hand portion 12 includes a gripper 21 and a hand joint portion 22 provided between the gripper 21 and the arm 20. The hand joint portion 22 is connected to the gripper 21 and the arm 20. The vibration type driving apparatus may be used in the arm joint portion 11 or the hand joint portion 22. Generally, since a bending operation of an arm joint portion 11 and a gripping operation of a hand portion 12 of a robot require low rotational frequency and high torque motor output, the vibration type driving apparatus is suitably used.

Figure 13:
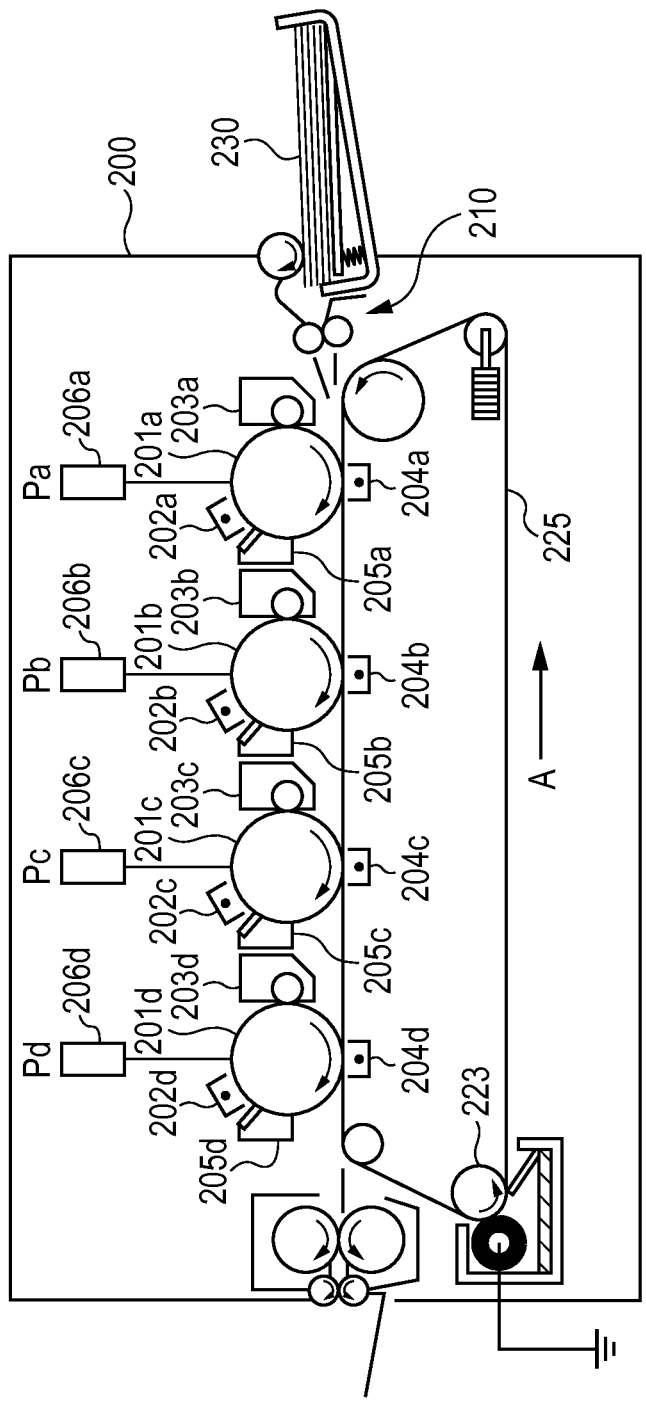
FIG. 13 is a schematic diagram of an example of a color image forming apparatus which is an apparatus on which a vibration type driving apparatus is mounted.

FIG. 13 is a side sectional view illustrating an internal configuration of a color image forming apparatus on which the vibration type driving apparatus is mounted. An image processing apparatus 200 in which four image forming units Pa, Pb, Pc and Pd are provided is illustrated as an example.

Each of the image forming units Pa to Pd has substantially the same configuration: the image forming units Pa to Pd include photosensitive drums 201a, 201b, 201c and 201d, respectively, which are image bearing members that are driven to rotate.

Chargers 202a, 202b, 202c and 202d are provided on the periphery of the photosensitive drums 201a to 201d, respectively, so as to uniformly charge the same. Further, on the periphery of the photosensitive drums 201a to 201d, developing units 203a, 203b, 203c and 203d for developing electrostatic latent images formed on the photosensitive drums 201a to 201d, chargers 204a, 204b, 204c and 204d for transferring developed images to a transfer material 230, and cleaning units 205a, 205b, 205c and 205d for removing toner which remains on the photosensitive drums 201a to 201d are arranged in this order in a rotational direction of the photosensitive drums 201a to 201d. Exposure devices 206a, 206b, 206c and 206d are provided above each of the photosensitive drums 201a to 201d.

A conveying belt 225 is driven in a direction of arrow A illustrated in FIG. 1 by a driving roller 223 and constitutes a conveying unit that bears the transfer material 230 fed by a feeding unit 210 and sequentially conveys the transfer material 230 to each of the image forming units Pa to Pd.

In FIG. 13, the vibration type driving apparatus is used as a driving motor for rotating the photosensitive drums 201a to 201d. Further, the vibration type driving apparatus is used also as a driving motor for rotating the driving roller 223 for driving the conveying belt 225.

Figure 14:
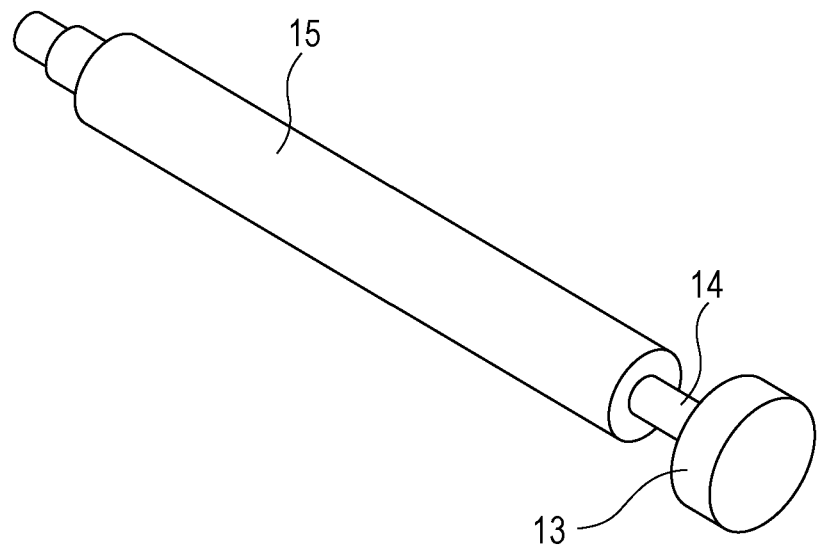
FIG. 14 is a diagram illustrating an example of application of a vibration type driving apparatus.

FIG. 14 illustrates a configuration in which a vibration type driving apparatus 13 is mounted for driving photosensitive drum 15. The vibration type driving apparatus 13 may be directly connected to a driving shaft 14 of the photosensitive drum 15. In this manner, since it is not necessary to use a reduction means, such as a gear, that has been needed, color deviation may be reduced and print quality may be improved.

Figure 15:
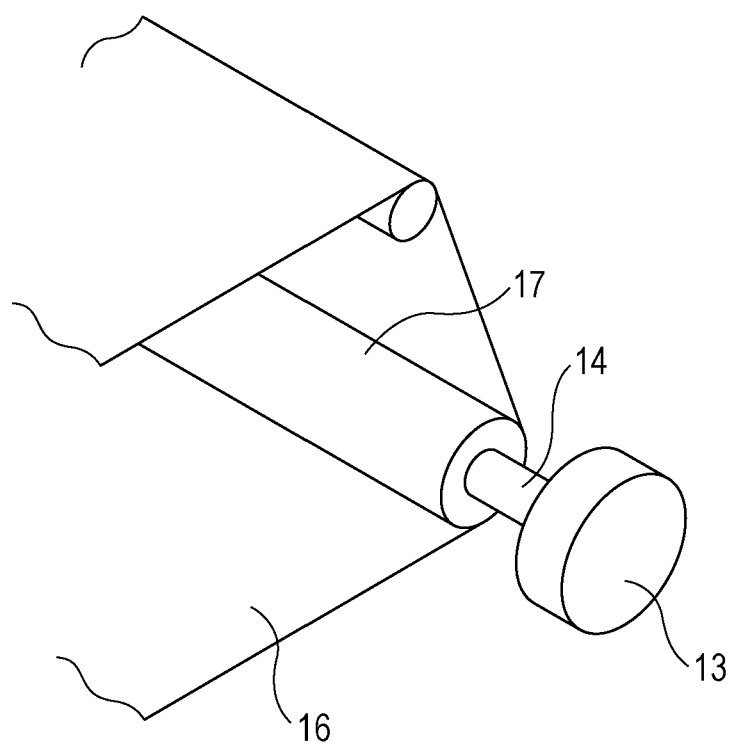
FIG. 15 is a diagram illustrating an example of application of a vibration type driving apparatus.

FIG. 15 illustrates a configuration in which a vibration type driving apparatus 13 is mounted for driving a conveying belt 16. In FIG. 15, the vibration type driving apparatus 13 may be directly connected to a driving shaft 14 of a driving roller 17. With this configuration, it is possible to improve print quality also in the driving of the conveying belt 16 as in the case of the photosensitive drum 15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-140520 filed Jul. 4, 2013 and No. 2014-118116 filed Jun. 6, 2014 which are hereby incorporated by reference herein in their entirety.

What is claimed is:

1. A vibration type driving apparatus, comprising:
a vibrating body comprising an elastic body comprising a vibrating portion, and an electrical-mechanical energy converting element fixed to the elastic body; and
a driven body in pressure contact with a frictional portion of the vibrating portion,
wherein
the vibrating body and the driven body are relatively moved by driving vibration generated when an alternating voltage is applied to the electrical-mechanical energy converting element;
the elastic body includes a fixing portion for fixing the vibrating body to another member, and a connecting portion for connecting the vibrating portion and the fixing portion; and
the connecting portion includes plural uneven rigidity components in a circumferential direction.

2. The vibration type driving apparatus according to claim 1, wherein plural through holes are provided in the connecting portion.

3. The vibration type driving apparatus according to claim 2, wherein a volume ratio k of the through holes to the connecting portion is 0.02≤k≤0.7.

4. The vibration type driving apparatus according to claim 1, wherein plural grooves are provided in the connecting portion.

5. The vibration type driving apparatus according to claim 1, wherein a thickness of the connecting portion has a distribution in a shape of a sine wave.

6. The vibration type driving apparatus according to claim 1, wherein the driving vibration is excited by m-th order bending vibration that is generated in the vibrating portion when the alternating voltage is applied to the electrical-mechanical energy converting element,
wherein m is an integer equal to or greater than 1.

7. An image forming apparatus, comprising:
an image bearing member;
a conveying belt disposed to face the image bearing member; and
the vibration type driving apparatus according to claim 1 that drives to rotate the image bearing member.

8. A vibration type driving apparatus, comprising:
a vibrating body comprising an elastic body provided with a vibrating portion, and an electrical-mechanical energy converting element fixed to the elastic body; and
a driven body that is in pressure contact with a frictional portion of the vibrating portion,
wherein
the vibrating body and the driven body are relatively moved by driving vibration generated when an alternating voltage is applied to the electrical-mechanical energy converting element;
the elastic body includes a fixing portion for fixing the vibrating body to another member, and a connecting portion for connecting the vibrating portion and the fixing portion;
the connecting portion includes uneven rigidity components in a circumferential direction; and
a number indicating quantity of the uneven rigidity components is i times (i is 0.5, 1 or 2) greater than the order of undesired vibration of which frequency is in a driving frequency range of the alternating voltage.

9. The vibration type driving apparatus according to claim 8, wherein plural through holes are provided in the connecting portion.

10. The vibration type driving apparatus according to claim 9, wherein a volume ratio k of the through holes to the connecting portion is 0.02≤k≤0.7.

11. The vibration type driving apparatus according to claim 8, wherein plural grooves are provided in the connecting portion.

12. The vibration type driving apparatus according to claim 8, wherein a thickness of the connecting portion has a distribution in a shape of a sine wave.

13. The vibration type driving apparatus according to claim 8, wherein the driving vibration is excited by m-th order bending vibration that is generated in the vibrating portion when the alternating voltage is applied to the electrical-mechanical energy converting element, wherein m is an integer equal to or greater than 1.

14. An image forming apparatus, comprising:
an image bearing member;
a conveying belt disposed to face the image bearing member; and
the vibration type driving apparatus according to claim 8 configured to rotate the image bearing member.

15. A vibration type driving apparatus, comprising:
a vibrating body comprising an elastic body provided with a vibrating portion, and an electrical-mechanical energy converting element fixed to the elastic body; and
a driven body in pressure contact with a frictional portion of the vibrating portion,
wherein
the vibrating body and the driven body are relatively moved by driving vibration generated when an alternating voltage is applied to the electrical-mechanical energy converting element;
the elastic body includes a fixing portion for fixing the vibrating body to another member, and a connecting portion for connecting the vibrating portion and the fixing portion;
the connecting portion includes uneven rigidity components in a circumferential direction; and
a number indicating quantity of the uneven rigidity components is j times (j is 0.5, 1 or 2) greater than an order of undesired vibration in a harmonic region of n times (n is an integer equal to or greater than 2) greater than the driving frequency range of the alternating voltage.

16. The vibration type driving apparatus according to claim 15, wherein plural through holes are provided in the connecting portion.

17. The vibration type driving apparatus according to claim 16, wherein a volume ratio k of the through holes to the connecting portion is 0.02≤k≤0.7.

18. The vibration type driving apparatus according to claim 15, wherein plural grooves are provided in the connecting portion.

19. The vibration type driving apparatus according to claim 15, wherein a thickness of the connecting portion has a distribution in a shape of a sine wave.

20. The vibration type driving apparatus according to claim 15, wherein the driving vibration is excited by m-th order bending vibration that is generated in the vibrating portion when the alternating voltage is applied to the electrical-mechanical energy converting element, wherein m is an integer equal to or greater than 1.

21. The vibration type driving apparatus according to claim 15, wherein n times of the driving frequency in the number indicating quantity of the uneven rigidity components is set to n=2 times.

22. An image forming apparatus, comprising:
an image bearing member;
a conveying belt disposed to face the image bearing member; and
the vibration type driving apparatus according to claim 15 configured to rotate the image bearing member.

23. A vibration type driving apparatus, comprising:
a vibrating body comprising an elastic body provided with a vibrating portion, and an electrical-mechanical energy converting element fixed to the elastic body; and
a driven body in pressure contact with a frictional portion of the vibrating portion,
wherein
the vibrating body and the driven body are relatively moved by driving vibration generated when an alternating voltage is applied to the electrical-mechanical energy converting element;
the elastic body includes a fixing portion for fixing the vibrating body to another member, and a connecting portion for connecting the vibrating portion and the fixing portion; and
the connecting portion includes uneven rigidity components in a circumferential direction, and a number indicating quantity of the uneven rigidity components is p times (p is 0.5, 1 or 2) greater than an order m (m is an integer equal to or greater than 1) of the driving vibration.

24. The vibration type driving apparatus according to claim 23, wherein plural through holes are provided in the connecting portion.

25. The vibration type driving apparatus according to claim 24, wherein a volume ratio k of the through holes to the connecting portion is 0.02≤k≤0.7.

26. The vibration type driving apparatus according to claim 23, wherein plural grooves are provided in the connecting portion.

27. The vibration type driving apparatus according to claim 23, wherein a thickness of the connecting portion has a distribution in a shape of a sine wave.

28. The vibration type driving apparatus according to claim 23, wherein the driving vibration is excited by m-th order bending vibration that is generated in the vibrating portion when the alternating voltage is applied to the electrical-mechanical energy converting element.

29. An image forming apparatus, comprising:
an image bearing member;
a conveying belt disposed to face the image bearing member; and
the vibration type driving apparatus according to claim 23 configured to rotate the image bearing member.

* * * * *